United States Patent [19]
Lacey

[11] 3,792,264
[45] Feb. 12, 1974

[54] PHOTOGRAPHIC APPARATUS

[76] Inventor: Thomas G. Lacey, 5250 N. Sixth St., Apt. E, Fresno, Calif. 93726

[22] Filed: Dec. 27, 1972

[21] Appl. No.: 318,933

[52] U.S. Cl................... 250/311, 250/457, 250/470
[51] Int. Cl............................................. H01j 37/36
[58] Field of Search.... 250/49.5 E, 49.5 A, 66, 311, 250/470, 457

[56] References Cited
UNITED STATES PATENTS
| | | | |
|---|---|---|---|
| 2,200,095 | 5/1940 | Marton | 250/49.5 E |
| 3,671,742 | 6/1972 | Browning | 250/66 |
| 3,696,245 | 10/1972 | Browning | 250/49.5 E |

Primary Examiner—James W. Lawrence
Assistant Examiner—B. C. Anderson
Attorney, Agent, or Firm—Huebner & Worrel

[57] ABSTRACT

A photographic apparatus having a housing defining an exposing chamber adapted to be mounted in evacuated photographic alignment with an electron microscope, the housing further defining a developing chamber and a passage interconnecting the chambers; a transporting table mounted for movement in the passage and adapted to receive a film negative; and a power system for positioning the table in the exposing chamber for exposure of a negative received thereon, motivating the table to the developing chamber, removing the negative from the table, and developing a film positive from the exposed negative.

6 Claims, 14 Drawing Figures

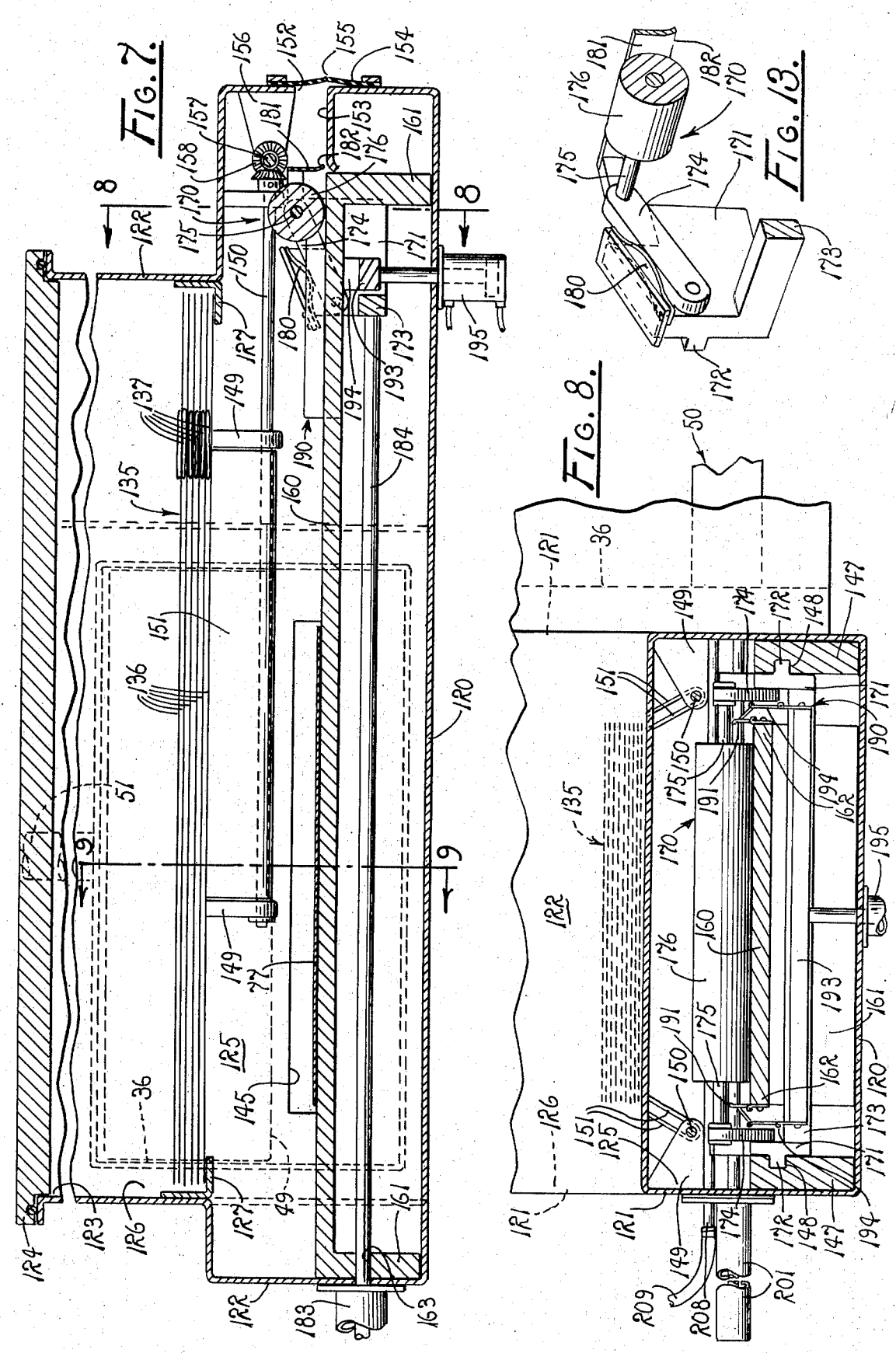

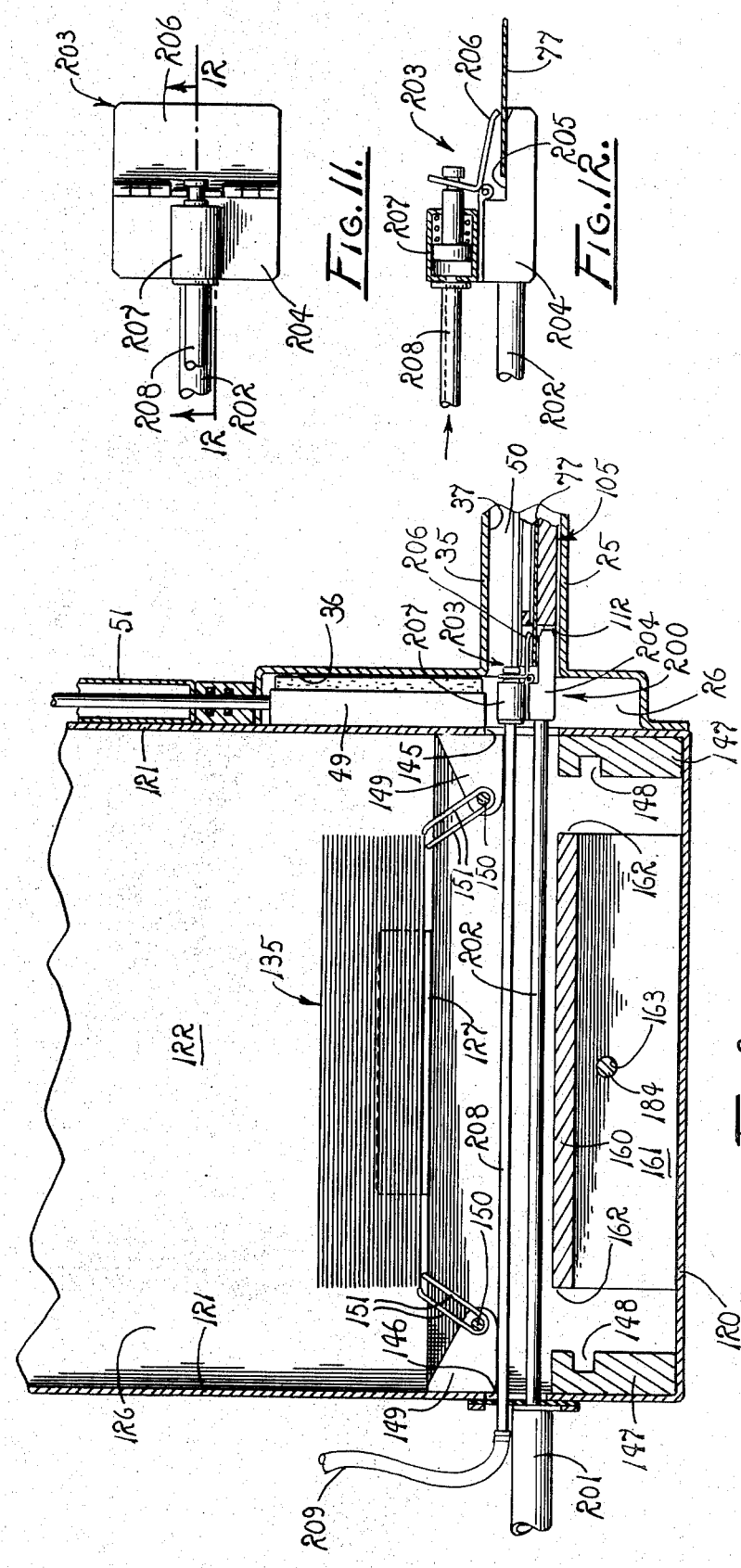

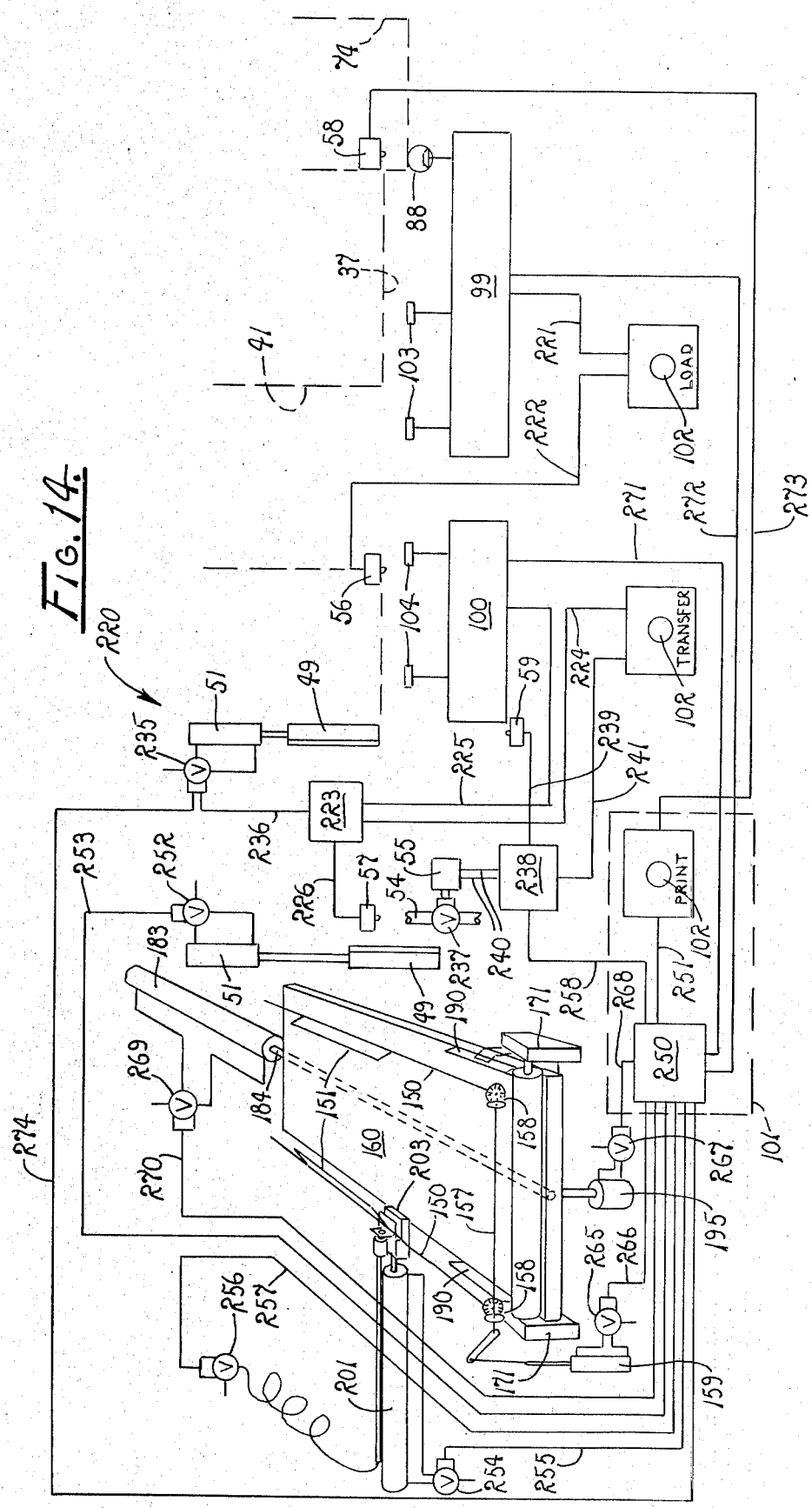

PHOTOGRAPHIC APPARATUS

BACKGROUND OF THE INVENTION

The present invention relates to a photographic apparatus and more particularly to such an apparatus which is specifically adapted for use on electron microscopes making possible the use of Polaroid or other self-developing film packets to permit very rapid photographic reproduction of specimens viewed through the electron microscope thereby assisting the operator in rapidly analyzing the specimen and in selecting the most beneficial photographic reproductions.

The prior art patents such as the Griswold U.S. Pat. No. 2,360,871; the Hillier U.S. Pat. No. 2,360,872; the Bensen U.S. Pat. No. 2,483,872; the Emerson U.S. Pat. No. 3,325,642; the Gabel U.S. Pat. No. 3,427,450; the Bouwmeester U.S. Pat. No. 3,529,154 and the Browning U.S. Pat. No. 3,671,742 disclose devices which deal in various ways with the problem of efficiently obtaining high quality photographic reproductions of images produced by electron microscopes. These devices typify prior art practices subject to deficiencies which the present invention has overcome.

Electron microscopes have been essential research tools in such fields of science as biology, chemistry and metallurgy due to their capability of obtaining greatly magnified images of specimens by means of electrons. Transmission electron microscopes permit visual examination of structures too fine to be resolved with ordinary microscopes using light as their source of illumination. Essentially a transmission electron microscope has a source for transmission of a beam of electrons of uniform velocity, a condenser lens for concentrating the electrons on the specimen, a specimen stage, an objective lens, a projector lens, and a fluorescent screen for viewing the magnified image. Additionally a photographic apparatus is provided for photographing the magnified image when desired. Since air molecules are capable of scattering the electrons and thus breaking up or preventing magnification of the specimen, the entire instrument must be evacuated to about $10^{-7}$ atmospheric pressure.

A photographic apparatus or camera is provided on conventional electron microscopes for two primary purposes. First, it is important to obtain a permanent record of observations made through the electron microscope. Second, since the granularity of the fluorescent screen is not nearly as fine as that of film, photographic reproductions are important in order to make more detailed observations of the magnified image. Frequently, such photographs of the magnified images disclose details not observable on the fluorescent screen.

Conventional photographic apparatus for electron microscopes have at least one major disadvantage. A photographic reproduction of the magnified image takes a minimum of 30 minutes to develop. Since frequently the exposure obtained is unsatisfactory due to specimen drift, voltage lag, improper exposure of the film negative or the like, the operator must often repeat the photographic procedure in an attempt to obtain a satisfactory exposure. This time lag and the resultant, inordinate expenditure of time required to obtain usable exposure significantly hinders research and detracts from the otherwise monumental advantages of electron microscopes.

In some cases television monitors are employed to provide an instantaneous reproduction of the magnified image and photographic reproductions are made from the television image produced. However, the detail of the television image is significantly less usable than that produced on the fluorescent screen. Accordingly, the use of such television monitors is of only very limited value.

Therefore, it has long been recognized as desirable to have a photographic apparatus which permits the use of self-developing film to produce very rapid reproductions of magnified images for purposes of immediate analysis in conducting research as well as to produce a photographic record of the observations made with the microscope.

SUMMARY OF THE INVENTION

In view of the foregoing, it is an object of the present invention to provide an improved photographic apparatus for electron microscopes.

Another object is to provide such an apparatus which permits the use of self-developing films.

Another object is to provide such an apparatus which permits the obtaining of a photographic reproduction of the magnified image for purposes of analysis in conducting research.

Another object is to provide such an apparatus which permits the rapid reproduction of a photographic image for use in producing a photographic record of observations made through an electron microscope.

Another object is to provide such an apparatus which is capable of rapid pressurization and evacuation so as to permit rapid transfer of an exposed film negative to allow developing of a film positive therefrom for use in analysis.

Another object is to provide such an apparatus which precludes the possibility of contamination of the evacuated interior of the electron microscope during use.

Another object is to provide such an apparatus which operates automatically so as to minimize the chances for human error in obtaining a photographic reproduction.

A further object is to provide such an apparatus which is of durable and dependable construction so as to insure a long operational life.

A still further object is to provide such an apparatus which is of relatively uncomplicated construction so as to minimize the expense involved in purchase.

Other objects and advantages of the present invention will subsequently become more clearly apparent upon reference to the following description.

BRIEF DESCRIPTION OF THE DRAWINGS

FIG. 7 is a somewhat enlarged transverse vertical section taken on line 7—7 of FIG. 1.

FIG. 8 is a longitudinal vertical section taken from a position indicated by line 8—8 in FIG. 7.

FIG. 9 is a longitudinal vertical section taken from a position indicated by line 9—9 in FIG. 7.

FIG. 10 is a perspective view of a portion of a platen for the apparatus.

FIG. 11 is a top plan view of a portion of a grasping mechanism for the apparatus.

FIG. 12 is a longitudinal vertical section taken on line 12—12 of FIG. 11.

FIG. 13 is a fragmentary perspective view of a roller mechanism for the apparatus.

FIG. 14 is a schematic illustration of an electrical circuit for automatic operation of the apparatus.

DESCRIPTION OF THE PREFERRED EMBODIMENT

Referring more particularly to the drawings, the photographic apparatus of the present invention is generally indicated by the numeral 10. As shown in dashed lines in FIG. 2, the apparatus is adapted to be mounted on the lower end of a transmission electron microscope generally indicated at 11, as will subsequently be described. However, it will become apparent that the photographic apparatus is adaptable for use on other types of microscopes as well as for use in other types of photographic operations in which it is desirable to control the environment in which the photographic operation is to be performed.

Figure 2:
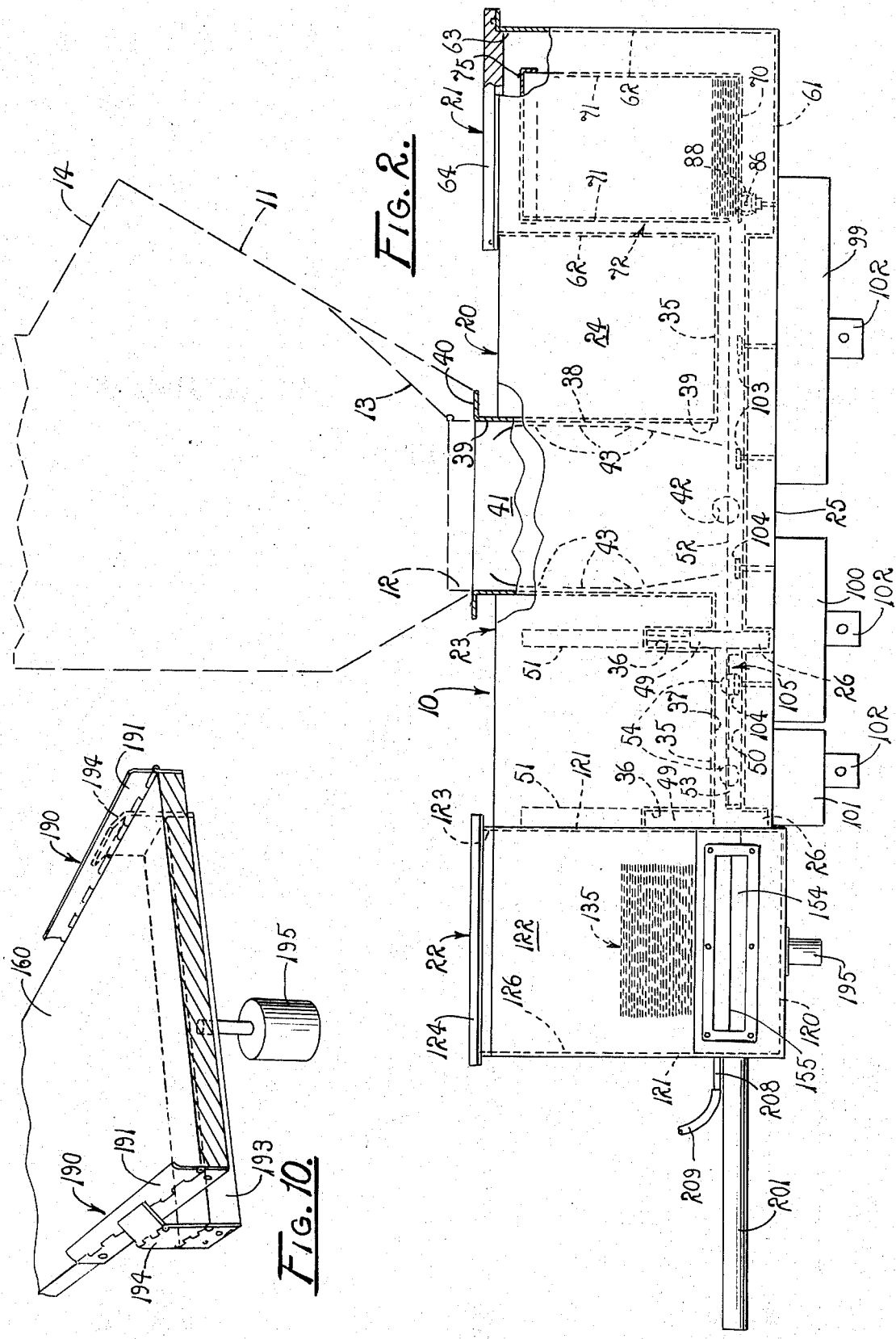
FIG. 2 is a front elevation of the apparatus shown mounted on an electron microscope fragmentarily illustrated in dashed lines.

As shown in FIG. 2, the electron microscope 11 has a downwardly facing photographic port 12. A fluorescent screen 13 is pivotally mounted in the interior of the microscope so as to be pivotal to a lowered position in covering relation to the photographic port. The screen is also pivotal to a raised position so as to leave the photographic port unobstructed. Controls, not shown, are provided for pivotally moving the fluorescent screen between the raised and lowered positions as desired. A viewing port 14 is provided in the microscope to permit observation of the fluorescent screen when in its lowered position. The microscope is adapted to transmit a stream of electrons, not shown, longitudinally thereof through a specimen and to project a magnified image of the specimen on the fluorescent screen when in the lowered position. Many conventional electron microscopes do not have shutter controls as such for use in making photographic reproductions. Such microscopes utilize pivoting of the fluorescent screen as well as controlling the projection of the stream of electrons as a substitute for a shutter in obtaining photographic reproductions. Other electron microscopes including that here to be described afford a shutter and associated photographic mechanisms, not shown, to control the transmission of a stream of electrons through the photographic port when the screen is in the raised position. The microscope also affords a conventional diffusion pump, also not shown, in operable connection therewith adapted to maintain the interior of the microscope in a preselected evacuated condition.

The photographic apparatus 10 has an elongated box-like housing 20 having work stations defined therein. A loading container 21 is integrally provided at one end of the housing and a developing container 22 is integrally provided at the other end thereof. The loading and developing containers define an intermediate portion of the housing extending between the containers. The intermediate portion of the housing has spaced, substantially parallel upright side walls 24 interconnecting the loading and developing containers of the housing. A bottom wall 25 is mounted in the intermediate portion of the housing extending between the loading and developing containers and interconnecting the side walls at the lower ends thereof in airtight relation substantially normal thereto. The bottom wall is angularly deformed so as to define a pair of spaced receptacles 26 extending transversely of the housing between the side walls. One of the receptacles is positioned immediately adjacent to the developing container and the other receptacle is positioned a predetermined distance therefrom within the intermediate portion, as will subsequently be described.

A pair of top walls 35 is secured in predetermined position extending between the side walls 24 in spaced, substantially parallel relation to the bottom wall 25. One of the top walls is immediately adjacent to the loading container 21 and the other top wall is immediately adjacent to the developing container 22. The top wall adjacent to the developing container is angularly deformed to define a second pair of receptacles 36 in individual vertical alignment with the receptacles 26. The bottom wall, top walls and side walls of the housing form an airtight passage 37 of predetermined minimum interior area interconnecting the loading and developing containers.

A box structure 38, having open opposite ends 39, is secured in one of its ends on the adjacent ends of the top walls 35 and between the side walls 24 of the housing extending substantially normal to the top walls. The box structure has a peripheral flange 40 integrally provided at the opposite end thereof remote from the passage 37. The box structure defines an exposing chamber 41 for the apparatus which communicates with the passage 37 in airtight relation. The box structure is adapted to be mounted on the lower end of the electron microscope 11 by its peripheral flange being secured by any suitable means in airtight covering relation to the photographic port 12 with the exposing chamber in precise alignment with the stream of electrons projected from the microscope through the photographic port. A first evacuation line 42 interconnects the exposing chamber with the diffusion pump of the microscope so that the single pump can maintain the microscope, exposing chamber, passage and loading container 21 in a common evacuated condition. Suitable electromagnetic elements 43 are mounted on the box structure within the exposing chamber 41 capable of maintaining focus and acceleration of the electron image projected by the stream of electrons from the position of the fluorescent screen in its lowered position longitudinally of the exposing chamber to a predetermined position adjacent to the passage, as will subsequently be described. The elements are electrically connected through a circuit, not shown, to the power source and controls for the microscope.

A closure or airtight door 49 is mounted for vertical movement within corresponding vertically aligned receptacles 26 and 36 as shown in FIG. 2. The doors are positionable in a lowered position in which they seal in airtight relation a portion of the passage 37 so as to define an evacuation chamber 50 therebetween of minimal interior area. The doors are positionable in a raised position in which both ends of the evacuation chamber are open so as fully to communicate with the remainder of the passage. A ram 51 is mounted on the top wall 35 above each receptacle 36 in individual connection with the airtight door of that receptacle. The rams are operable selectively to motivate the doors between the raised and lowered positions as will subsequently be more clearly described.

A pair of parallel guide rails 52 is mounted in predetermined spaced relation on the bottom wall 25 in the passage 37 interconnecting the loading container 21 of the housing 20 with the receptacles 26 and 36 nearest the exposing chamber 41. A second pair of guide rails 53 is mounted in individual alignment with each of the first pair of guide rails on the bottom wall extending longitudinally through the evacuation chamber 50 interconnecting the receptacles 26.

A branched evacuation line 54 is secured in communication with the evacuation chamber 50. The line is connected to a conventional diffusion pump, not shown, adapted rapidly to evacuate or alternatively to pressurize the chamber since the chamber is of minimal interior area. A pressure gauge 55 is mounted on one of the side walls 24 in communication with the interior of the evacuation chamber and in operable connection with the diffusion pump adapted to operate the pump to maintain a selected pressure within the evacuation chamber. A limit switch 56 is mounted on one of the guide rails 52 at the extreme left side of the exposing chamber 41, as viewed in FIG. 1. A limit switch 57 is mounted at the end of one of the guide rails 53 adjacent to the developing container 22.

The loading container 21 of the housing 20 has a bottom wall 61 and four upstanding side walls 62 continuous therewith. The loading container is integral with the intermediate portion 23 of the housing 20 by the nearest side wall 62 being affixed on the bottom wall 25, top wall 35 and side walls 24. The side walls 62 of the loading container define an open upper end 63 adapted to receive in airtight relation a lid 64.

Figure 3:
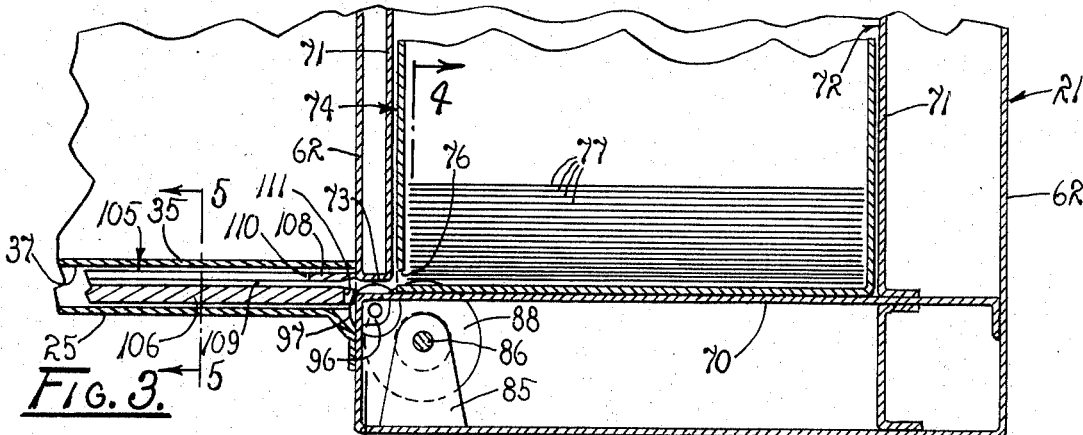
FIG. 3 is a somewhat enlarged longitudinal, vertical section taken on line 3—3 of FIG. 1.
Figure 4:
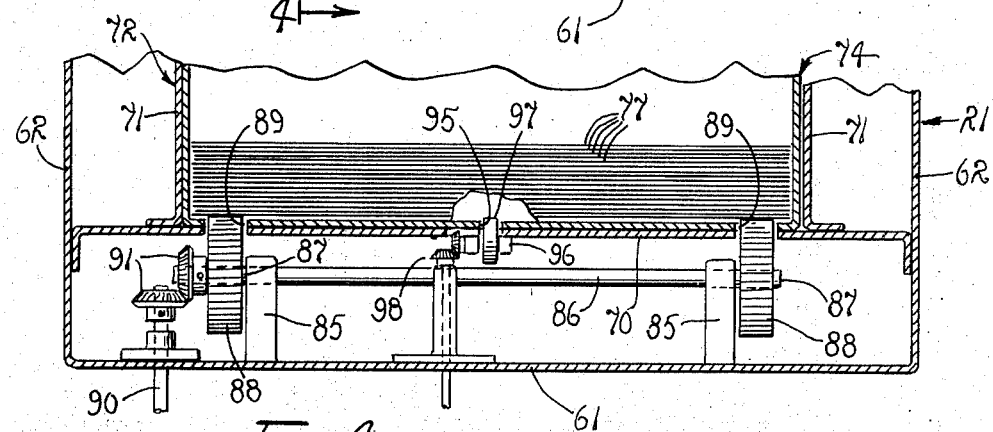
FIG. 4 is a transverse vertical section taken from a position indicated by line 4—4 in FIG. 3.

An interior floor 70 is mounted on the upstanding side walls 62 of the loading container 21 in substantially parallel spaced relation from the bottom wall 61 of the container, as best shown in FIG. 4. Four upstanding interior walls 71 are mounted on the interior floor in predetermined spaced relation to each other so as to define a box receptacle 72. The upstanding side wall 62 and interior wall 71 most closely adjacent to the intermediate portion 23 of the housing 20 are spaced from the interior floor 70 so as to define a slot 73 which communicates with the passage 37 of the housing in airtight relation. A negative box 74, having a lid 75 pivotally mounted at the upper end thereof is adapted to be received in the box receptacle 72. The box has a slot 76 therein extending along the bottom thereof so as to communicate with the slot 73 of the box receptacle when the box is received in the receptacle. The box is adapted to receive in stacked relation a plurality of photographically sensitive film negatives 77, as shown best in FIG. 3. The negatives can be of any suitable type for black and white, or color photography such as the Polaroid-type films.

A pair of shaft mounts 85 are affixed in spaced relation on the bottom wall 61 of the loading container between the bottom wall and the interior floor 70 and adjacent to the slot 73. A shaft 86 having opposite ends 87 is journaled in the mounts extending transversely of the housing 20 and substantially parallel to the bottom wall with the opposite ends thereof extending in opposite directions beyond the mounts, as best shown in FIG. 4. A pair of feeder rollers 88 is mounted for rotation with the shaft, the rollers being individually mounted on the opposite ends thereof outwardly of the mounts. The peripheral portions of each roller extend through passages 89 in the interior floor of the loading container and negative box 74 so as to engage the lowermost film negative 77 received in the container. A drive shaft 90 is rotatably mounted in the bottom wall 61 of the loading container and extends upwardly adjacent to one end of the shaft 86. A bevel gear assembly 91 interconnects the drive shaft with the adjacent end of the shaft 86 for rotation of the shaft in the mounts.

A slot 95 extends through the interior floor 70 of the loading container 21 in a central position communicating with the slot 73 and the passage 37 of the housing 20. A roller mounting assembly 96 is affixed on the interior floor between the floor and the bottom wall 61 and in abutment against the upstanding side wall 62 most closely adjacent to the passage 37. The assembly is in vertical alignment with the slot 95. A secondary feeder roller 97 of smaller diameter than that of the feeder rollers 88 is received for rotational movement in the mounting assembly with its peripheral portion extending through the slot 95 and into the slot 73 of the loading container 21. A secondary drive assembly 98 is mounted in driving engagement with the secondary feeder roller and operably extends through the bottom wall 61, as best shown in FIG. 4.

Figure 5:
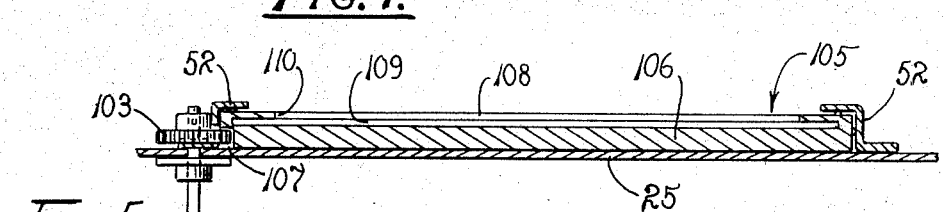
FIG. 5 is a transverse vertical section taken from a position indicated by line 5—5 in FIG. 3.

First, second and third drive boxes 99, 100, and 101 respectively are secured on the bottom wall 25 of the housing 20 in longitudinal alignment and adjacent to the nearest side wall 24, as viewed in FIG. 2. Each of the drive boxes mounts a cycle switch 102 which is operable to initiate a predefined series of operations within the apparatus 10. As shown in FIG. 2, the first drive box displays suitable indicia such as the word "load" on the exterior thereof. Similarly the second drive box displays the word "transfer" and the third drive box the word "print." The drive shaft 90 and secondary drive assembly 98 are connected in driven relation to the first drive box. A first pair of drive gears 103 is rotationally mounted in the passage 37, one midway between the loading container 21 and the exposing chamber 41 and the other within the exposing chamber. A second pair of drive gears 104 is rotationally mounted in the passage 37, one within the exposing chamber and the other within the evacuation chamber 50. The peripheries of both pair of drive gears extend through the adjacent guide rails 52 or 53, as shown best in FIG. 5. The first pair of gears is connected in driven relation to the first drive box. The second pair of gears is connected in driven relation to the second drive box, as best shown in FIG. 2.

Figure 6:
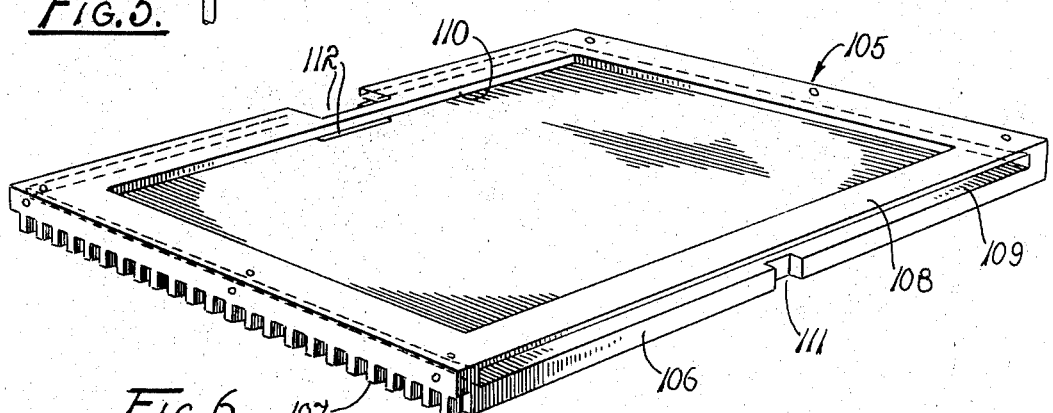
FIG. 6 is a perspective view of a transporting table for the apparatus.

A substantially rectangular carrier or transporting table 105 is received for slidable movement in the guide rails 52 and 53 within the passage 37 of the housing 20. As shown best in FIG. 6, the transporting table has a flat base plate 106 having a gear track 107 integrally provided along the end thereof adjacent to the gears 103 and 104. The gear truck is of a length sufficient to be engaged in driven relation by at least one of the gears of each pair of gears 103 or 104 at any given time regardless of where the table is positioned in the passage. A positioning frame 108 overlays the base plate in substantially parallel spaced relation to the plate so as to define a negative passage 109 of minimal depth extending through the table, as shown best in FIGS. 4 and 5. The positioning frame affords a substantially rectangular display window 110 therein. A roller notch 111, of dimension sufficient to allow receipt of the secondary feeder roller 97 therein is provided centrally of the side of the table closest to the loading container 21. A grasping notch 112, of somewhat larger predetermined dimensions than the roller notch, is provided centrally of the side of the table closest to the developing container 22. The transporting table is thus positionable in the rails from an extreme right position as viewed in FIGS. 1 and 2 with the secondary roller received in the roller notch to an extreme left position in which the grasping notch is immediately adjacent to the receptacles 26 and 36 closest to the developing container.

The developing container 22 consists of a bottom wall 120 having upstanding parallel side walls 121 and upstanding end walls 122. The upwardly extending ends of the side walls and end walls define a substantially rectangular opening 123 adapted to receive a lid 124 in covering relation thereto. As shown in FIG. 7, the end walls of the developing container are angularly bent so as to define a lower developing chamber 125 and an upper packet storage chamber 126 within the developing container. A pair of right-angled supports 127 are individually fastened on each of the end walls extending inwardly intermediate the storage and developing chambers.

As shown in FIG. 7 the storage chamber 126 of the developing container 22 is adapted to receive in stacked relation a plurality of self-developing film packets 135 in rested relation on the right-angled supports 127. Each of the packets consists of a positive developing paper portion 136 having a pair of developing jelly sacks 137 integrally attached adjacent to one end thereof. The paper portion of each packet is photosensitive to an exposed negative when placed in facing engagement therewith in the catalytic presence of the developing jelly contained in the sacks.

The developing container 22 is integral with the intermediate portion 23 of the housing 20, as best shown in FIG. 9. The side wall closest to the intermediate portion of the housing is fastened on the side walls 24, bottom wall 25, and top wall 35 of the housing in facing engagement with the adjacent vertically aligned receptacles 26 and 36. The side wall mounted on the intermediate portion of the housing has a rectangular slot 145 therein in communication with the passage 37 and having length corresponding to the distance between the guide rails 53. An opening 146 of predetermined dimensions is provided in the other side wall of the developing container in horizontal alignment with the slot 145. A pair of guides 147 is secured on the bottom wall running longitudinally of the developing chamber 125, one being positioned against each side wall of the developing container The guides have slots 148 individually provided therein extending longitudinally of the developing chamber parallel to the bottom wall, as best shown in FIG. 9. A pair of flanges 149 is mounted in spaced relation on each side wall extending inwardly of the develoing chamber above the rectangular slot 145 and opening 146 respectively. A shaft 150 is rotationally received in each pair of flanges extending longitudinally of the developing chamber. A pair of grasping plates 151 is fastened on each shaft intermediate its pair of flanges for rotation with the shaft. The plates of each pair extend a predetermined distance inwardly of the developing chamber in spaced parallel relation, as best shown in FIG. 8.

The end wall 122 on the right, as viewed in FIG. 7, has a print opening 152. The end wall is inwardly bent so as to form a ledge 153 in a common plane with the bottom of the rectangular slot 145. A resilient cover piece 154 is secured on the exterior of the end wall in covering relation to the print opening. The cover piece has a slit 155 in registry with the opening.

A pair of flanges 156 is secured in spaced parallel relation on the end wall 122 extending inwardly of the developing chamber 125 immediately above and on opposite sides of the print opening 152. A control shaft 157 is journaled in the flanges for rotational movement about an axis normal to the shafts 150. A pair of bevel gear assemblies 158 is borne by the control shaft, the assemblies being in individual driving engagement with the shafts 150. A pneumatic cylinder 159 is mounted on the exterior of the side wall 121 in driving engagement with the control shaft. As will subsequently be more clearly apparent, the cylinder is adapted to rotate the grasping plates 151 through the control shaft between a raised position with their remote ends grasping the edges of the lowermost film packet 135 rested on the supports 127, as best shown in FIG. 9, and a lowered position.

A platen 160, having downwardly extending legs 161 at the opposite ends thereof, is mounted within the developing chamber 125 of the developing container 22 on the bottom wall 120 extending longitudinally between the guides 147. So mounted, the plane defined by the upper surface of the platen corresponds with that of the ledge 153, as best shown in FIG. 7. As shown in FIG. 8, the platen is equally spaced from the guides 147 and contacts the ledge at one end thereof and the opposite end wall 122 at the other end thereof. The platen has opposite sides 162. A passage 163 extends through the leg of the platen and the end wall of the developing container opposite that having the ledge 153.

A roller mechanism 170 is mounted within the developing chamber 125 for slidable movement in the slots 148 of the guides 147, as best shown in FIGS. 7 and 8. The roller mechanism is composed of a pair of slide members 171 each having a key 172. Each of the members is mounted on one of the guides with its key received in the slot 148 of its respective guide. Each slide member is disposed intermediate a side 162 of the platen and its respective guide. The slide members are interconnected by a bar 173 extending under the platen. An arm 174 is fastened on each of the slide members on the opposite side thereof from its key for pivotal movement. A shaft 175 is rotationally secured on the remote ends of the arms in interconnecting relation so as to extend across the upper surface of the platen 160 and to be pivotal upwardly therefrom. A cylindrical roller 176 is mounted on the shaft for rotational movement therewith and disposed so as to rest on the platen.

A compression spring assembly 180 is affixed on each of the slide members 171 in engagement with its respective arm 174 so as resiliently to maintain the roller in engagement with the platen 160, as shown best in FIGS. 7 and 13. A scraping blade 181 is fastened on and extends from the remote ends of the arms 174 so as to extend parallel to the roller and transversely of the platen. The blade has an edge 182 which is bent away from the roller and extends downwardly from the remote ends of the arms the same distance as the lowermost peripheral portion of the roller. A pneumatic cylinder 183, having a power arm 184, as mounted on the end wall 122 of the developing container having the passage 163. The pneumatic cylinder is mounted in covering relation to the passage with the power arm extending therethrough and secured at its remote end to the bar 173 of the roller mechanism 170.

A clamping mechanism 190 is secured on the platen 160 at the end thereof adjacent to the ledge 153, as best shown in FIG. 10. The mechanism includes a pair of elongated plates 191 pivotally mounted along their longitudinal edges on the opposite sides 162 of the platen and pivotal so as to be engageable with the upper surface of the platen at the end thereof nearest the ledge. A control bar 193 extends transversely of the developing chamber 125 beneath the platen. A pivotal linkage 194 interconnects each of the opposite ends of the control bar with its respective adjacent plate 191 so that when the bar is vertically elevated the linkages pivot the plates into engagement with the upper surface of the platen. A pneumatic cylinder 195 is affixed to the exterior of the bottom wall 120 of the developing container in driving connection with the control bar and is adapted to operate the clamping mechanism 190 by selectively vertically positioning the control bar.

As shown best in FIG. 9, a grasping mechanism 200 is mounted on the developing container 22 for movement transversely of the developing chamber 125. The mechanism consists of a pneumatic cylinder 201 secured on the side wall 121 of the developing container in partial covering relation to the opening 146 thereof. The pneumatic cylinder has a rod 202 operably extended therefrom for movement transversely of the developing chamber. A pneumatic clamp 203 is operably secured on the remote end of the rod and adapted to be extended partially into the passage 37 of the housing 20 when the rod 202 is extended farthest from the cylinder 201, as shown in FIG. 9. The clamp has a foot 204 defining a shallow recess 205 on the upper surface thereof. A pivot plate 206 is pivotally mounted on the foot above the recess, as best shown in FIG. 12. A spring loaded pneumatic cylinder 207 is fastened on the foot in connection with the pivot plate. A rigid tube 208 is operably affixed on the pneumatic cylinder 207 and extends parallel to the rod 202 out through the opening 146 of the developing container 22. A flexible hydraulic hose 209 is connected to the remote end of the tube outwardly of the developing container.

It will be recognized that the photographic apparatus 10 of the present invention could be operated by a wide variety of types of systems both manual and power or combinations thereof. FIG. 14 schematically illustrates an electrical or power system 220 which is adapted for automated operation of the photographic apparatus. Preferably the power system is mounted in the electron microscope 11 along with and as an integral part of the photographic apparatus.

The cycle switch 102 of each of the drive boxes 99, 100 and 101 is connected to a source of power, not shown. The first drive box 99 is actuated from its cycle switch by an electrical conductor 221. The cycle switch of the first drive box is electrically connected to the limit switch 56 in the exposing chamber by an electrical conductor 222. The cycle switch of the second drive box 100 is operably connected to a sequence switch 223 through an electrical conductor 224. The sequence switch is electrically connected to the second drive box through a conductor 225. The limit switch 57 is connected to the switch 223 through a conductor 226.

A pneumatic valve 235 in communication with a source of air under pressure, not shown, is connected to the sequence switch 223 through electrical conductor 236 so as to be operable by the sequence switch to operate the ram 51 in connection with the airtight door 49 adjacent to the exposing chamber 41. A control valve 237 is provided in the evacuation line 54 to control the flow of air to and from the evacuation chamber 50. A relay 238 is mounted in connection with the valve 237 adapted on impulse to open and close the valve. The limit switch 59 in the right receptacle 26, as viewed in FIG. 2, is connected to the relay 238 through a conductor 239 so that the relay is operable to open the control valve 237 to admit air to the evacuation chamber 50 when the airtight door trips the limit switch 59 upon lowering. The pressure gauge 55 is connected to the relay 238 through a pair of conductors 240. The relay operates to close the valve 237 when atmospheric pressure has been reached within the evacuation chamber as registered by the pressure gauge 55, as will subsequently be more fully explained. The relay is connected to the cycle switch 102 of the second drive box by conductor 241 so that upon the establishment of atmospheric pressure within the evacuation chamber, the flow of power through the cycle switch of the second drive box is terminated.

The third drive box 101 contains a sequence switch 250. The cycle switch 102 of the third drive box is connected to the switch 250 by a conductor 251. A control valve 252 connected to the source of air under pressure, now shown, is connected to the ram 51 adapted to operate the airtight door 49 within the receptacles 26 and 36 adjacent to the developing container 22. The valve 252 is adapted upon impulse to operate the ram selectively to position the airtight door in the raised or lowered positions. An electrical conductor 253 operatively interconnects the sequence switch 250 and the control valve 252. A valve 254 connected to the source of air under pressure, not shown, is mounted in controlling relation on the pneumatic cylinder 201. The valve is connected to the switch 250 by a conductor 255 adapted to operate the valve to extend the rod 202 of the cylinder so as to position the pneumatic clamp 203 horizontally between the retracted position shown in FIG. 14 and the extended position as shown in FIG. 9. A valve 256 is mounted in communication with the flexible pneumatic hose 209 and connected to the source of air under pressure, not shown. The valve 256 is connected to the sequence switch 250 through a conductor 257 so that the switch operates the valve to in turn operate the spring loaded pneumatic cylinder 207 so as to pivot the pivot plate 206 with respect to the foot 204 of the grasping mechanism 200. A conductor 258 interconnects the switch 250 and the relay 238. Relay 238 thus operates the control valve 237 upon impulse from the sequence switch to evacuate the evacuation chamber through evacuation line 54.

A valve 265, in communication with the source of air under pressure, not shown, is mounted in operable connection with the pneumatic cylinder 159. The valve 265 is connected to the sequence switch 250 through a conductor 266. The valve 265 is adapted to operate the cylinder 159 to rotate the grasping plates 151 between the raised and lowered positions upon impulse from the sequence switch. A valve 267 in connection with the source of air under pressure, not shown, is secured in communication with the pneumatic cylinder 195 and adapted to operate the clamping mechanism 190. A conductor 268 interconnects the switch 250 and the valve 267 to supply the impulse for operation of the pneumatic cylinder 195. A valve 269 in communication with the source of air under pressure, not shown, is affixed in operable communication with the pneumatic cylinder 183 adapted to motivate the roller mechanism 170 between the extended and retracted positions. The valve 269 is connected to the switch 250 by way of a conductor 270. An electrical conductor 271 connects the switch 250 with the second drive box 100. The switch 250 is adapted to operate the second pair of drive gears 104 through the conductor 271. An electrical conductor 272 interconnects the switch 250 with the first drive box 99. The switch 250 is adapted to operate the first pair of drive gears 103 through conductor 272. An electrical conductor 273 interconnects the limit switch 58 at the loading container 21 with the cycle switch 102 of the third drive box 101 adapted to terminate the flow of power therethrough when the limit switch is tripped. An electrical conductor 274 operably interconnects the sequence switch 250 with the valve 235.

OPERATION

The operation of the described embodiment of the subject invention is believed to be clearly apparent and is briefly summarized at this point. Once a magnified image of a specimen is selected by visual observation through the viewing port 14 of the image projected on the lowered fluorescent screen 13 of the microscope 11, the photographic apparatus 10 is ready to be employed to obtain a photographic image of the specimen. A supply of film packets 135 is first rested in stacked relation on the supports 127 of the packet storage chamber 126. Similarly a supply of negatives 77 is rested in stacked relation in the negative box 74.

Figure 1:
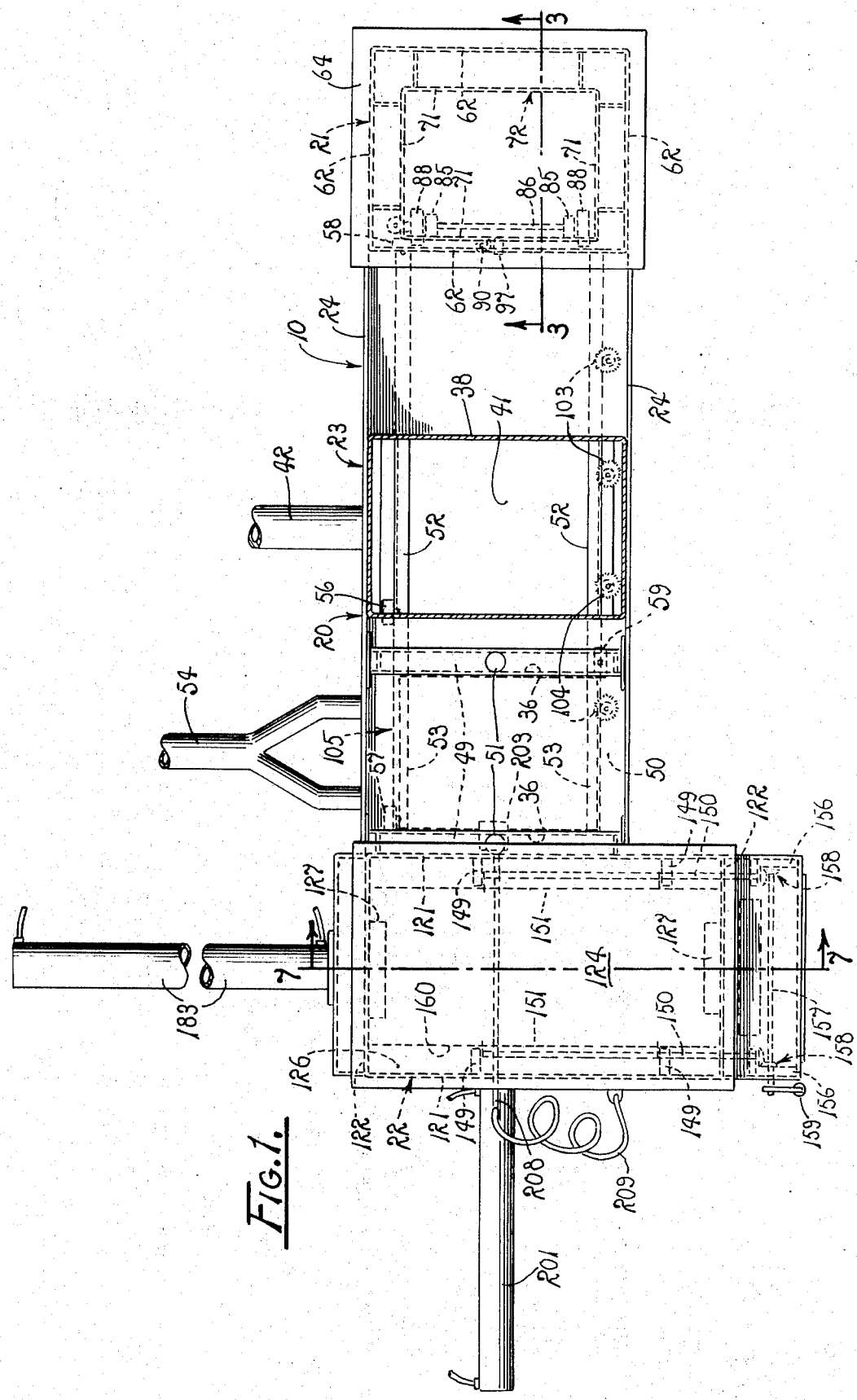
FIG. 1 is a top plan view of the photographic apparatus of the present invention.

In the start position, the transporting table 105 is at the extreme right of the intermediate portion 23 of the housing 20, as viewed in FIGS. 1 and 2, with the secondary feeder roller 97 received in the roller notch 111. The door 49 adjacent to the developing container 22 is in the lowered position so as to seal the passage 37 from the interior of the developing container in airtight relation. The other door is at this time maintained in a raised position so as to leave the passage at that point unobstructed. The evacuation line 42 in connection with the diffusion pump, not shown, of the electron microscope maintains the exposing chamber 41, evacuation chamber 50 and passage 37 as well as the interior of the negative box 74 in a common evacuated condition corresponding to that of the interior of the electron microscope. Thus, air is evacuated from these portions of the photographic apparatus so as not to interfere with a stream of electrons projected through the microscope and into the photographic apparatus. The interior of the developing container 22 is always maintained at atmospheric pressure, as will subsequently be described.

To initiate operation of the photographic apparatus 10, the operator presses the cycle switch 102 of the first drive box 99 which rotates the feeder rollers 88 and secondary feeder roller 97 in a counterclockwise direction, as viewed in FIG. 3. The rotation of the feeder rollers causes the film negative 77 at the bottom of the stack to be drawn through the slot 73 and inserted in the negative slot 109 of the transporting table 105 facing upwardly through the display window 110 of the positioning frame 108. The drive box selectively operates the feeder rollers only a length of time sufficient to complete the insertion of the negative within the transporting table so that only one negative is so positioned.

The first drive box 99 subsequently automatically drives the first pair of drive gears 103 in a counterclockwise direction, as viewed in FIG. 1, so as to motivate the transporting table 105 along the pair of guide rails 52 and into the exposing chamber 41. When the transporting table is in precise photographic alignment with the interior of the electron microscope 11, the table trips the limit switch 56 so that an electrical impulse is transmitted through the conductor 222 to terminate the flow of power through the cycle switch 102 of the first drive box.

The negative 77 received in the transporting table 105 is now ready for exposure. The fluorescent screen 13 is pivoted to the raised position utilizing the previously described controls. The electron microscope 11 is then operated to project the stream of electrons through the specimen so as to project the image onto the film negative 77 on the table. It will be noted that the electromagnetic elements 43 insure that the stream of electrons is maintained in focus so that the image to which the negative is exposed is precisely the same as that projected on the fluorescent screen 13 of the microscope. The length of exposure is selected by operating the controls of the microscope, not shown, and will depend upon the sensitivity of the film being used as well as the character of the specimen being photographed. The photographic apparatus 10 is at this time not in operation since the flow of current through cycle switch 102 has been terminated, as described.

Subsequent to exposure of the negative 77 the operator presses the cycle switch 102 of the second drive box 100 to cause power to be transmitted from the source through the electrical conductor 224 to the sequence switch 223. The sequence switch then causes power to be transmitted through the conductor 225 to the second drive box 100 to rotate the second pair of drive gears 104 in a counterclockwise direction, as viewed in FIG. 1. The transporting table 105 with the exposed negative is thus transported in the pair of guide rails 53 into the evacuation chamber 50 until the limit switch 57 is tripped by the table when fully received within the evacuation chamber. Tripping of limit switch causes the sequence switch 223 to terminate the flow of power to the second drive box 100 thereby terminating rotation of the second pair of drive gears 104.

Simultaneously the sequence switch 223 operates the valve 235 through the electrical conductor 236 to operate the ram 51 to move the door 49 on the right in FIG. 2 to the lowered position in the airtight sealing relation to the evacuation chamber 50 so as to enclose the table 105 therein. When the door reaches the lowered position it trips the limit switch 59. This operates the relay 238 through conduit 239 to in turn operate the valve 237 to admit air to the interior of the evacuation chamber through the evacuation line 54. When the pressure gauge 55 registers that atmospheric pressure has been reached within the evacuation chamber, the relay 238 is operated through the pair of conductors 240 to close the valve 237 to retain atmospheric pressure within the evacuation chamber. Subsequently the relay, by way of electrical conductor 241, terminates the flow of power through the cycle switch 102 of the second drive box 100.

The photographic apparatus is now ready to print a film positive from the exposed negative 77. The cycle switch 102 of the third drive box 101 is pressed by the operator to supply power from the source, not shown, through conductor 251 to the sequence switch 250. The sequence switch energizes the valve 252 through the conductor 253 to operate the ram 51 in connection with the airtight door 49 adjacent to the developing container 22 to raise the door until the evacuation chamber fully communicates with the interior of the developing container. Since atmospheric pressure has been established in the evacuation chamber, no disruptive turbulence is created within the evacuation chamber or developing chamber 125 by raising the door. At the same time, the desired evacuated condition is maintained in the exposing chamber 41, passage 37, negative box 74 and the interior of the microscope 11.

Subsequently the sequence switch 250 energizes the valve 254 by way of conductor 255 to operate the pneumatic cylinder 201 to extend the pneumatic clamp 203 into the grasping notch 112 of the transporting table 105. The sequence switch 250 then operates the valve 256 through the conductor 257 to in turn operate the spring loaded pneumatic cylinder 207 to cause the pneumatic clamp to grasp the negative 77, as best shown in FIG. 12. Subsequently the sequence switch 250 again energizes the valve 254 to retract the clamp by means of the pneumatic cylinder 201 so as to draw the negative from the transporting table and onto the platen 160. The sequence switch then again operates the valve 256 in turn to operate the spring loaded pneumatic cylinder 207 to release the negative thereby depositing the negative in rested relation on the platen.

After the pneumatic clamp 203 has drawn the negative 77 from the evacuation chamber 50, the sequence switch 250 operates the ram 51 through the conductor 253 and valve 252 to motivate the door 49 adjacent to the developing container 22 to the lowered position. Once the door is in the sealed, lowered position, the operations on opposite sides of the door, hereafter described, take place simultaneously.

The sequence switch 250 energizes the valve 265 through the conductor 266 to operate the pneumatic cylinder 159 to rotate the grasping plates 151 to the lowered position so as to position a self-developing film packet 135 on the platen 160 in covering relation to the exposed negative 77 and subsequently to return the grasping plates 151 to the raised position. The sequence switch 250 then operates the pneumatic cylinder 195 through the conductor 268 and valve 267 to operate the clamping mechanism 190 to secure the film packet in covering relation to the negative on the platen.

Thereafter, the sequence switch 250 operates the pneumatic cylinder 183 through the conductor 270 and valve 269 to retract the roller 176 longitudinally of the developing chamber 125. Thus, the roller under pressure of the compression spring assembly 180 causes the developing jelly sacks 137 to burst and distribute their contents between the paper portion 136 of the packet and the film negative 77 in the conventional manner. The sequence switch 250 maintains the roller at the extreme left of the developing chamber 125, as viewed in FIG. 7, for a preselected period of time sufficient to allow the development of a positive photographic reproduction on the paper portion 136 of the packet from the exposed negative 77 in the catalytic presence of the contents of the sacks. During this intervening period the sequence switch 250 again operates the pneumatic cylinder 195 through the conductor 268 and valve 267 to operate the clamping mechanism 190 to release the film packet 135 from retention thereby on the platen 160. Subsequently the switch 250 again operates the pneumatic cylinder 183 to extend the roller from left to right, as viewed in FIG. 7, until it is returned to the position shown in FIG. 7. During movement of the roller, the edge 182 of the scraping blade 181 contacts the adjacent end of the film packet and negative pushing them from the developing container 22 through the slit 155 in the cover piece 154. Then in the convention manner the operator peels the positive paper portion 136 from the negative detaching the paper portion from the developing jelly sacks 137. The photographic reproduction of the magnified image displayed on the paper portion is then available for observation and analysis.

As previously described, when the door 49 adjacent to the developing container 22 is returned to the lowered position the above described operations take place simultaneously with the operations, now to be described, within the remainder of the apparatus 10. With both doors in the lowered position, the sequence switch 250 operates the valve 237 through conductor 258 and relay 238 to evacuate the evacuation chamber 50 through the evacuation line 54 utilizing the diffusion pump, not shown, of the microscope 11. When the pressure gauge 55 registers that an evacuated condition has been produced within the evacuation chamber corresponding to that of the exposing chamber 41, the relay 238 operates valve 237 to terminate evacuation of the evacuation chamber. Subsequently, the sequence switch 250 operates the ram 51 through conductor 274 and valve 235 to motivate the airtight door 49 adjacent to the exposing chamber 41 to its normal, raised position.

The sequence switch 250 thereafter energizes the second drive box 100 through the conductor 271 to rotate the second pair of drive gears 104 in a clockwise direction, as viewed in FIG. 1. Thus, the transporting table 105 is moved from the evacuation chamber 50 on the rails 53. Simultaneously the switch 250 operates the first drive box 99 through the conductor 272 to rotate the first pair of drive gears 103 in a clockwise direction, as viewed in FIG. 1. Thus, the transporting table 105 is motivated to the right, as viewed in FIG. 1, until the secondary feeder roller 97 is again received in the roller notch 111 of the transporting table. At this point the table trips the limit switch 58 causing a termination of the flow of power through the cycle switch 102 of the third drive box 101 and therefore through the sequence switch 250. Thus, the photographic apparatus is again in the start position allowing the operator to make a new photographic exposure of the magnified image.

Therefore, the photographic apparatus of the present invention permits the operator of an electron microscope to produce very rapid photographic reproductions, using Polaroid or other self-developing film, of magnified images observed through the microscope for purposes of immediate analysis in conducting research as well as to provide a photographic record of the observations made through the microscope.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An electronic camera comprising an exposing chamber, an electronic microscope having a target object receiving means and a focal point within the exposing chamber, a loading chamber in communication with the exposing chamber, a supply of electronically sensitive self-developing film in the loading chamber, a developing chamber in communication with the exposing chamber, means for actuating the self-developing film in the developing chamber, means for evacuating air from the exposing and loading chambers, a door between the exposing chamber and the developing chamber operable to isolate the developing chamber from the exposing chamber whereby air can be evacuated from the exposing chamber and the loading chamber and alternatively to open the exposing chamber to the developing chamber, transport means for transporting film from the loading chamber to the focal point in the exposing chamber and from the focal point to the developing chamber, and control means for actuating the transport means to deliver film from the loading chamber to the focal point, for actuating the evacuating means to remove air from the exposing chamber and the loading chamber, for actuating the electronic microscope to expose the film at the focal point, to open the door between the exposing chamber and the developing chamber, for actuating the transport means to deliver the exposed film to the developing chamber, for actuating the developing means, and for closing the door between the developing chamber and the exposing chamber whereby the exposing chamber and the supply chamber can again be evacuated.

2. A photographic apparatus for photographing a work object viewed through an electron microscope by a stream of electrons projected through the work object from the microscope, the apparatus comprising a housing; walls mounted on the housing so as to define an exposing chamber, said chamber being adapted to be mounted on the microscope in alignment with the stream of electrons, a developing chamber, and a passage interconnecting the chambers; a transporting table mounted for movement in the passage from the exposing chamber to the developing chamber and return; means for selectively, individually evacuating air from the exposing chamber and the passage; sequencing means mounted on the housing for positioning electron sensitive film on the table and motivating the table into the exposing chamber for exposing the film to the stream of electrons projected through the work object from the microscope, individually evacuating the passage, transferring the table with the film into the passage, and individually bringing the passage substantially to atmospheric pressure; and means adapted to receive a self-developing film packet mounted in the developing chamber for developing a photograph by transferring the exposed film from the table in the passage into the developing chamber and placing said film in photograph printing relation to the self-developing film packet.

3. An apparatus for photographing a subject in an atmosphere of preselected pressure utilizing a plate sensitive to electronic exposure and adapted for automatic developing, the apparatus comprising a housing having a loading chamber, an exposing chamber, and an evacution chamber; means mounted on the housing for photographically exposing a plate in the exposing chamber to the subject; a plate recieving carrier; means mounting said carrier for movement in the housing into the exposure chamber in plate exposing relation to the subject and subsequently into the evacuation chamber; means for selectively controlling the pressure within the loading chamber, the exposing chamber, and said evacuation chamber during transfer of the carrier to and from the exposing chamber; and plate removing means mounted on the housing.

4. The apparatus of claim 3 in which the housing is adapted to be mounted on an electron microscope operable to project an image of the subject with the exposing chamber in evacuated communication with the microscope and in photographic alignment with the subject.

5. The apparatus of claim 3 in which the loading chamber is in evacuated communication with the exposing chamber and means are mounted on the housing for selectively, successively depositing plates on the carrier.

6. The apparatus of claim 5 in which the plate removing means includes a developing chamber provided in the housing in communication with the evacuation chamber and means are mounted in said chamber for transferring a plate from the carrier within the evacuation chamber into the developing chamber and developing a photograph therefrom utilizing a self-developing film packet.

* * * * *

UNITED STATES PATENT OFFICE
CERTIFICATE OF CORRECTION

Patent No. 3,792,264　　　　　　　　Dated　February 12, 1974

Inventor(s)　Thomas G. Lacey

It is certified that error appears in the above-identified patent and that said Letters Patent are hereby corrected as shown below:

In the Specification:

Column 3, line 14 after "mechanism" and before "the" delete "for" and insert ---of---.

Column 6, line 64 after "gear" and before "is" delete "truck" and insert ---track---.

Column 14, line 22 after "the" and before "manner" delete "convention" and insert ---conventional---.

In the Claims:

Column 15, line 49 after "mounted" and before "the" delete "on" and insert ---in---.

Column 16, line 25, after "plate" and before "carrier" delete "recieving" and insert ---receiving---.

Signed and sealed this 21st day of May 1974.

(SEAL)
Attest:

EDWARD M. FLETCHER, JR.
Attesting Officer

J. MARSHALL DANN
Commissioner of Patents